No. 657,856. Patented Sept. 11, 1900.
D. S. COOK.
AUTOMATIC WEIGHING MACHINE.
(Application filed Aug. 10, 1898.)
(No Model.) 3 Sheets—Sheet 2.
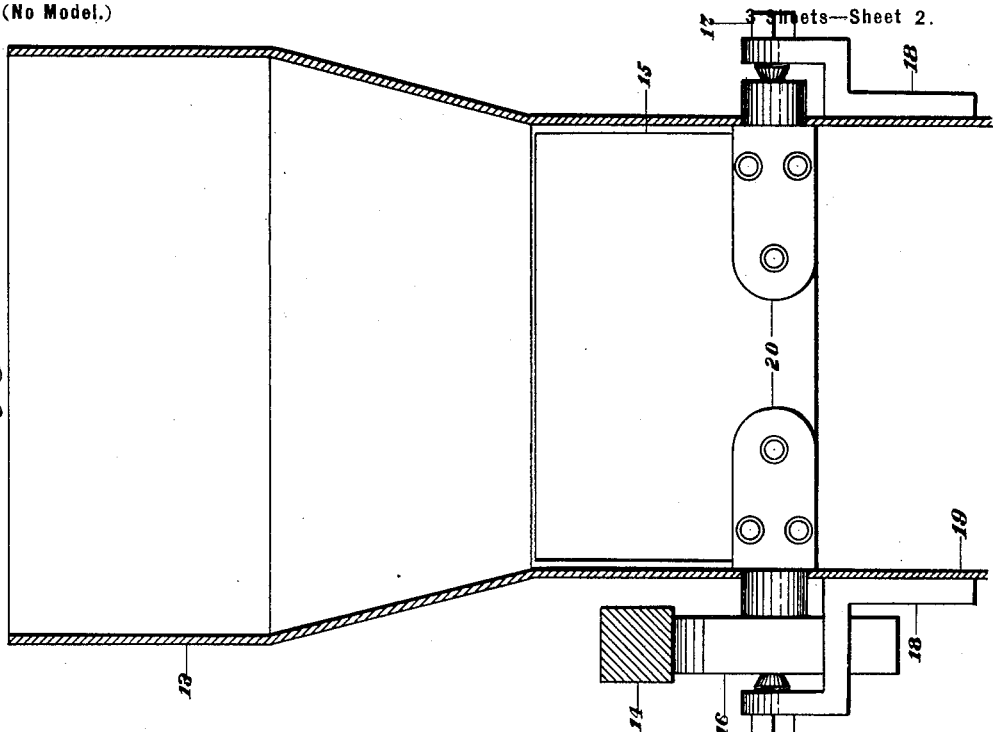
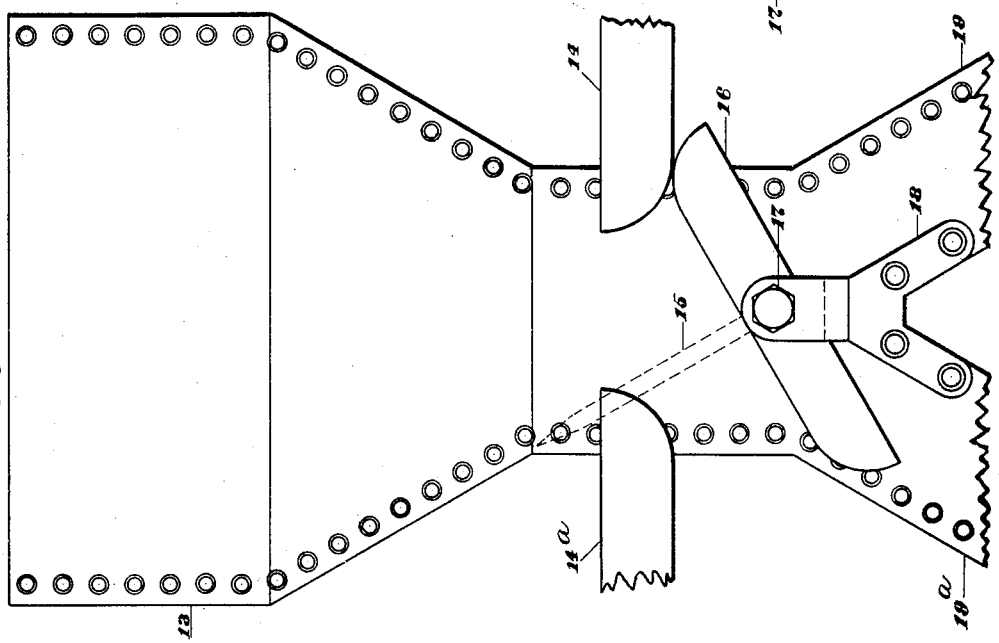
WITNESSES.
Geo. M. Anderson
Geo. H. Parmelee
INVENTOR
D. S. Cook
PER E. W. Anderson
his ATTORNEY.
THE NORRIS PETERS CO., PHOTO-LITHO., WASHINGTON, D. C.

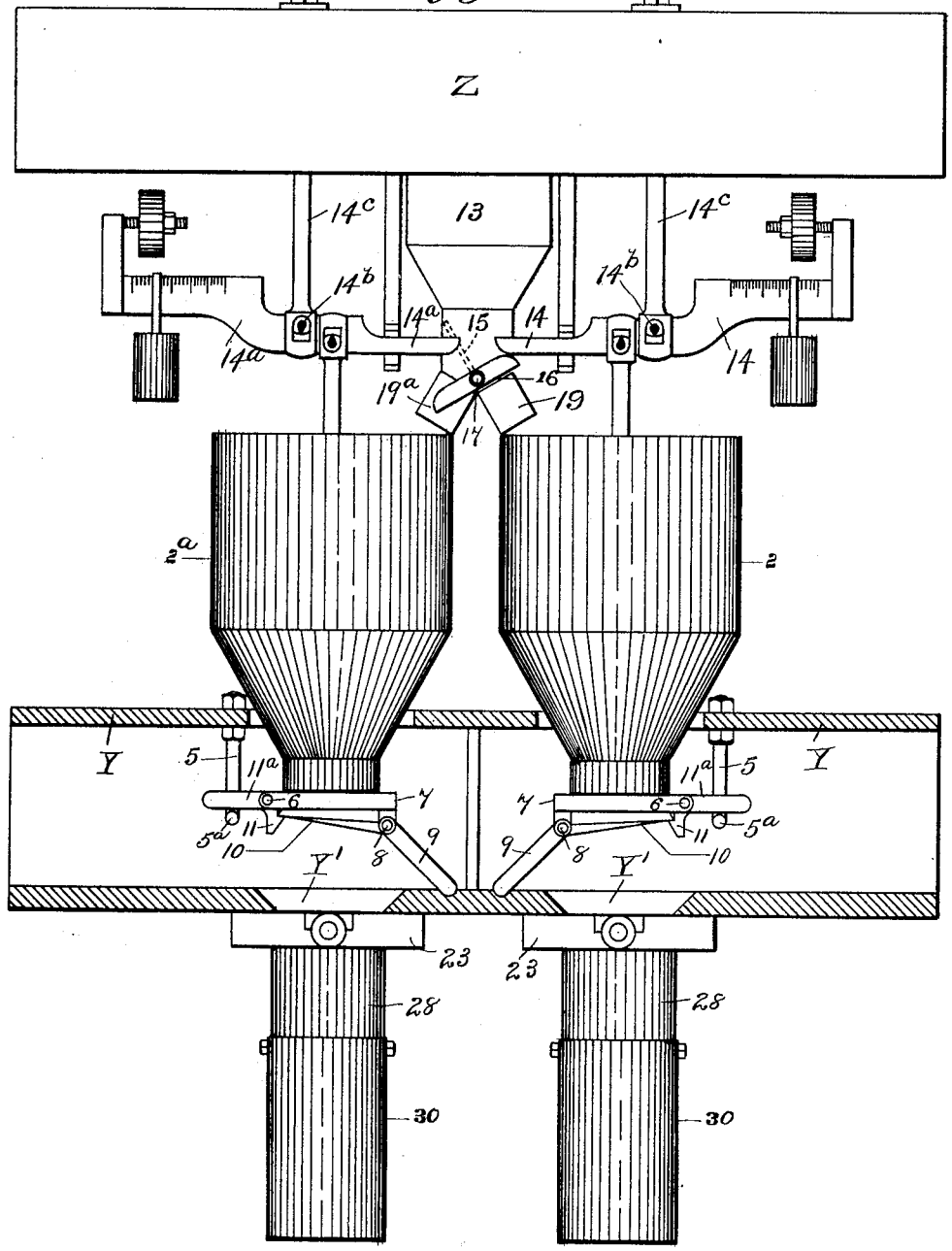

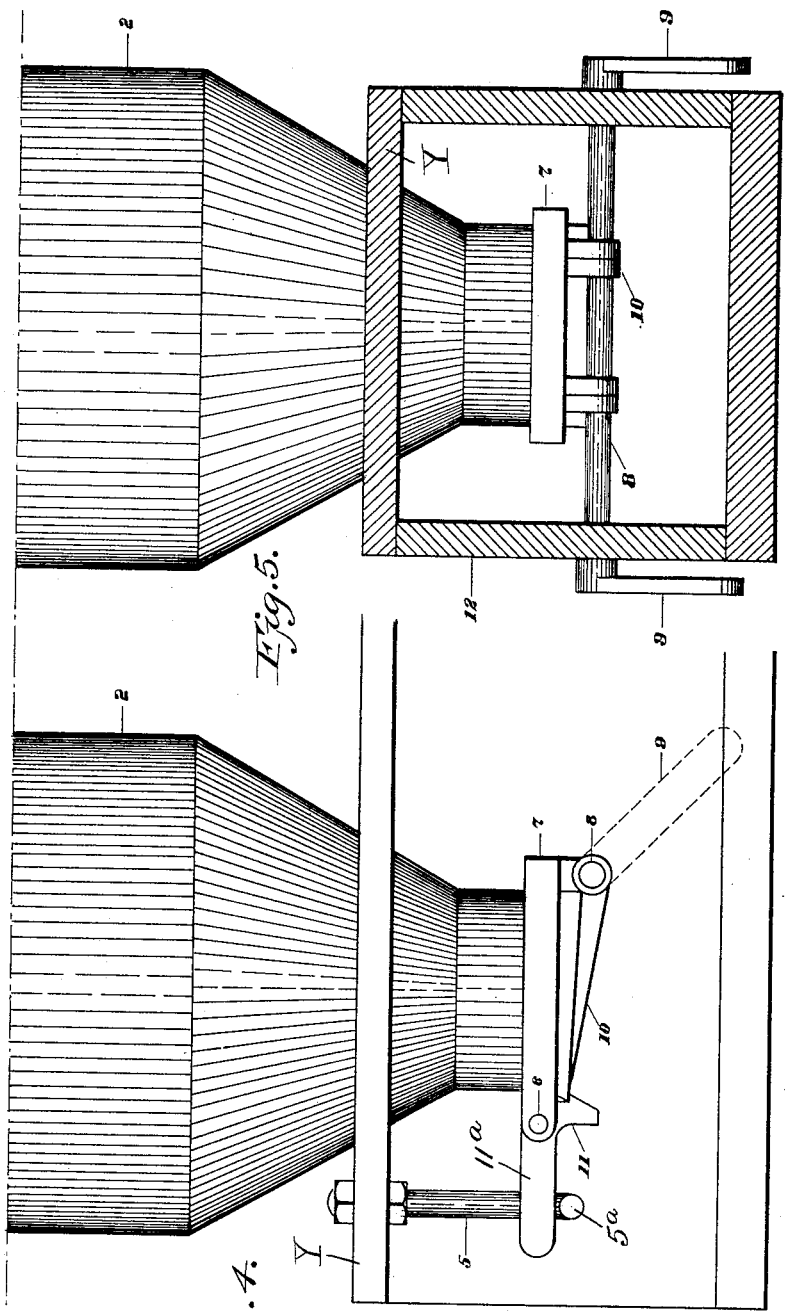

# UNITED STATES PATENT OFFICE.

DAVID S. COOK, OF SELLERSBURG, INDIANA.

AUTOMATIC WEIGHING-MACHINE.

SPECIFICATION forming part of Letters Patent No. 657,856, dated September 11, 1900.

Application filed August 10, 1898. Serial No. 688,264. (No model.)

*To all whom it may concern:*

Be it known that I, DAVID S. COOK, a citizen of the United States, and a resident of Sellersburg, in the county of Clark and State of Indiana, have invented certain new and useful Improvements in Automatic Weighing and Packing Machines; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

My invention has relation to certain new and useful improvements in automatic weighing and packing machines; and its object is to provide automatic means of simple character for weighing the product of mills, &c., during the process of manufacture or discharge.

With this object in view the invention consists in the novel construction and combination of parts, all as hereinafter described, and pointed out in the appended claim.

In the accompanying drawings, Figure 1 is a front elevation, partly in section, of the complete machine. Fig. 2 is a front elevation of the receiving-hopper on a larger scale. Fig. 3 is a vertical section of the same. Fig. 4 is a front view of one of the weigh-boxes and its automatic trip. Fig. 5 is a side view of the same with the casing in section.

Referring to the drawings, the numeral 13 designates a receiving-hopper, into which the material to be weighed and packaged is discharged or delivered from a mill or other source. Said hopper is constructed with a branched or double discharge 19 19$^a$, one branch or leg being arranged to discharge into a receptacle or weigh-box 2 and the other branch or leg into a second and similar receptacle or weigh-box 2$^a$. Pivoted within the hopper upon centers 17, supported in brackets 18, secured to the outside of the hopper, is a valve-plate 15, upon which the material delivered into the hopper falls and is thereby directed into one or the other of said weigh-boxes, according to the position of said plate. One of the journals 20 of the valve-plate 15 has fixed thereto outside of the hopper a double-armed lever 16, whose respective arms at their rounded extremities are adapted to be impinged upon the rounded under sides of the inner end portions of the scale-beams 14 14$^a$, as hereinafter described.

The weigh-boxes are suspended, respectively, from scale-beams 14 14$^a$, which are intermediately fulcrumed at 14$^b$ on supports 14$^c$, which depend from a suitable support Z, from which the hopper 13 is also supported. The two weigh-boxes, with their adjuncts and sack or package holders, are duplicates of each other, and a description of one will equally apply to both, similar reference numerals or characters being applied to corresponding parts upon both.

The weigh-box is formed with a contracted discharge at its lower end, which is normally closed by a valve 10, carried by a rock-shaft 8, which is journaled in depending lugs of a casting 7, secured to the bottom of the weigh-box, and which is provided with cranks 9. The valve 10 is normally held in closed position by means of a latch 11, which is pivoted at 6 to the casting 7 and whose horizontal arm 11$^a$ extends above the horizontal arm 5$^a$ of a knee-bolt 5, which depends from a stationary casing Y. The bottom of the casing Y underneath each weigh-box is formed with an opening Y′, and secured to the casing around each of said openings is a centrally-open casting 23. Secured in said casting is a depending pipe 28, which carries a suitable package-holder. This package-holder 30 consists principally of two expanding sleeves 30, which surround the lower portion of the discharge-pipe 28. This casing Y is continuous underneath the weigh-boxes, the discharge or lower end portions of which project thereinto through openings in the upper wall thereof. The openings Y′ of the weigh-boxes are opposite these openings through which project the weigh-boxes. In this way the valves and valve mechanism controlling the discharges of the weigh-boxes are entirely inclosed and protected from being tampered with, the cement is guarded from drafts while being transferred from weigh-box to package, a support is provided for the knee-bolt 5$^a$, any cement which may sift out while in process of such transferral is preserved for future collection, and should such siftings of cement become so great as to clog or interfere with the operation of the device it may be readily blown through and out of such casing and collected at one end thereof.

The operation of the machine is as follows: Supposing the valve-plate 15 to be in the position indicated in Figs. 1 and 2, the material delivered to the hopper 13 passes through the discharge branch or leg 19 into the weigh-box 2 and onto the plate 10. When sufficient material has been delivered into the said box to overcome the weight on the scale-beam 14, (which has been previously set at the desired point,) said scale-beam is depressed, thereby depressing the adjacent arm of the lever 16 and throwing the valve-plate 15 over to the other side of the hopper, thereby causing the material to be discharged through the branch or leg 19$^a$ into the hopper 2$^a$. The lowering of the weigh-box 2 by reason of the weight of the product contained therein causes the arm 11$^a$ of the latch 11 to strike the arm 5$^a$ of the knee-bolt 5, thereby releasing the said latch. The valve 10 then opens by gravity and discharges the contents of the box through the casing Y and opening Y' into the pipe 28 and thence into the sack or package which is supported by the package-holder 30, as above described. In the meantime the weigh-box 2$^a$ has received its load and a similar operation takes place with that box. After operation the valves 10 are closed by manual operation of the cranks 9. This operation continues so long as material is delivered to the hopper 13, the work of the attendant being confined to closing the valves 10 and to placing and removing the sacks or packages.

Having thus described my invention, what I claim as new, and desire to secure by Letters Patent, is—

In weighing apparatus, the combination of the scale-beams, the weigh-boxes suspended therefrom, the continuous casing or inclosure, having openings in its upper wall through which project the lower end portions of said boxes, and openings in its lower wall opposite said first-named openings, the hopper having the branched discharge into said weigh-boxes, means for controlling the discharge of said hopper, the valve-plates controlling the discharge of said weigh-boxes, the catches for said plates, means whereby said catches are released upon descent of said beams and weigh-boxes, and packaging apparatus communicating with said last-named openings of said inclosure, substantially as specified.

In testimony whereof I affix my signature in presence of two witnesses.

DAVID S. COOK.

Witnesses:
JAS. M. WINTERSMITH,
JNO. G. DAVIDSON.